United States Patent [19]

Rogers

[11] Patent Number: 4,839,979
[45] Date of Patent: Jun. 20, 1989

[54] SPEAR GUN TIP ASSEMBLY AND METHOD OF USE THEREOF

[75] Inventor: William H. Rogers, Jacksonville, Fla.

[73] Assignee: Sea Search, Inc., Jacksonville, Fla.

[21] Appl. No.: 171,018

[22] Filed: Mar. 21, 1988

Related U.S. Application Data

[63] Continuation-in-part of Ser. No. 072,297, Jul. 13, 1987.

[51] Int. Cl.⁴ ............................................. A01K 81/00
[52] U.S. Cl. ............................................. 43/6; 294/61
[58] Field of Search ................................. 43/6; 294/61

[56] References Cited

U.S. PATENT DOCUMENTS

| | | | |
|---|---|---|---|
| 18,458 | 10/1857 | Killy | 43/6 |
| 1,171,432 | 2/1916 | Henderson | 43/6 |
| 2,659,273 | 11/1953 | Trautman | 43/6 |
| 2,667,814 | 2/1954 | Blockmon | 43/6 |
| 2,708,860 | 5/1955 | Arpin | 43/6 |
| 2,758,408 | 8/1956 | Hertel | 43/6 |
| 2,951,306 | 9/1960 | Woodfield | 43/6 |
| 3,071,883 | 1/1963 | Merz | 43/6 |
| 4,624,068 | 11/1986 | Howard, III | 43/6 |

Primary Examiner—Nicholas P. Godici
Assistant Examiner—Karen Skillman

[57] ABSTRACT

A tip assembly for an underwater spear, the assembly including a shaft and a sharpened tip which is slidably disassemblable from the shaft, a flexible cable attached between the tip and shaft which can be readily detached from the shaft to remove the spear tip assembly from a fish by pulling the free end of the cable through a hole in a fish made by the assembly.

20 Claims, 3 Drawing Sheets

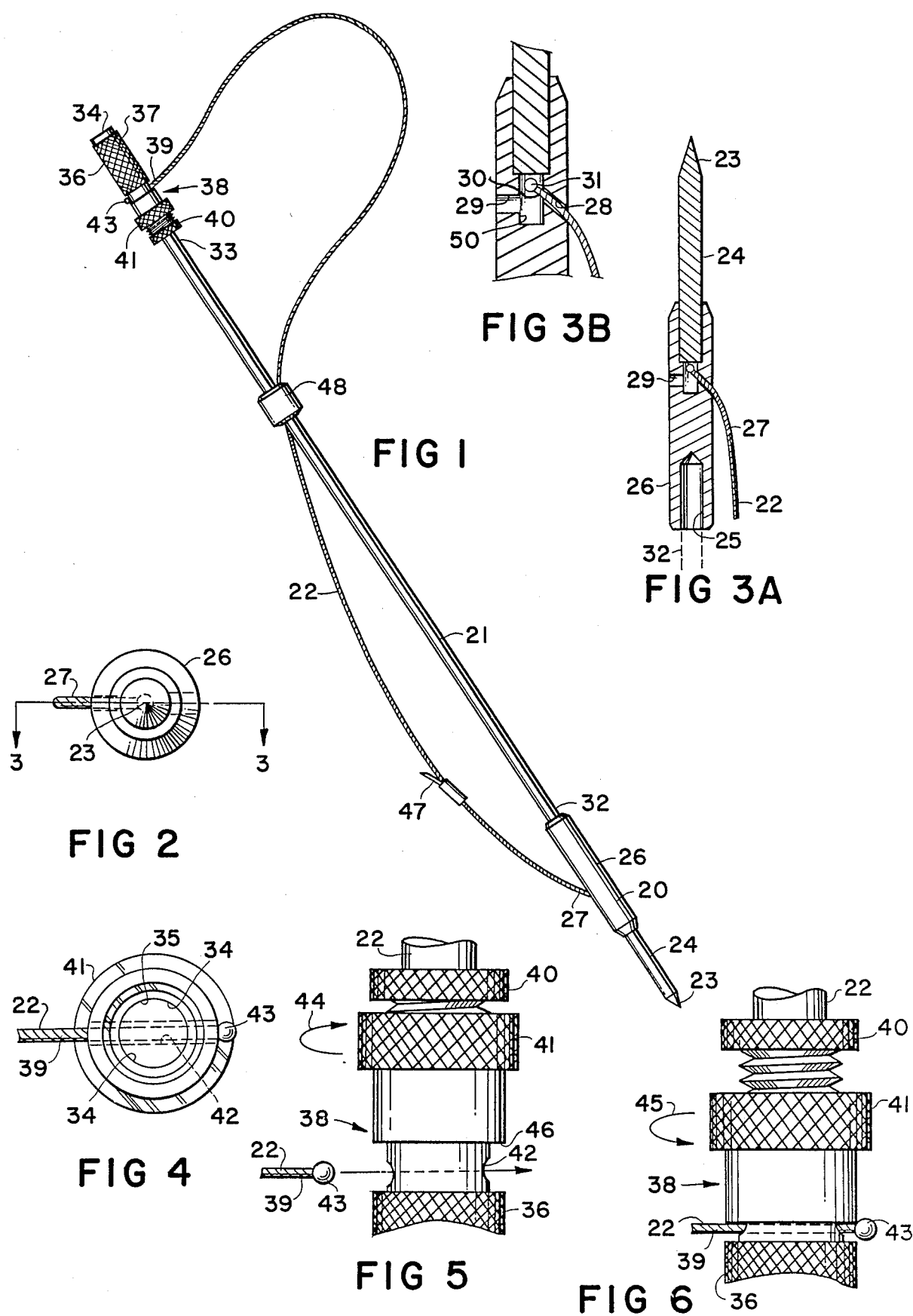

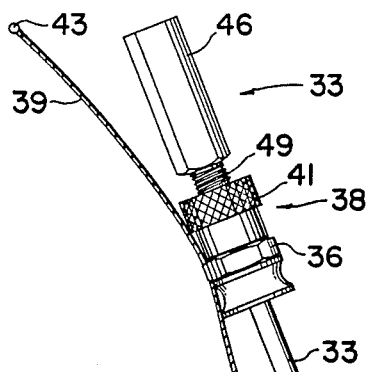
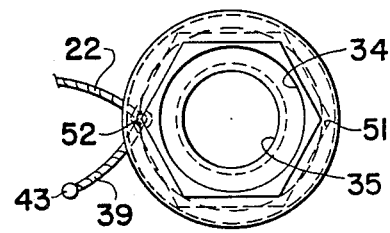
FIG 12
FIG 11
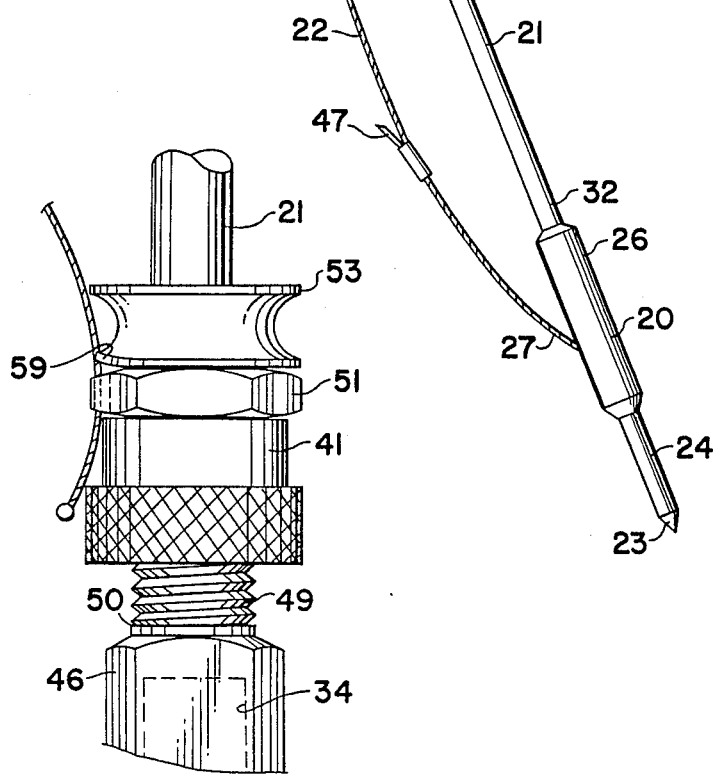
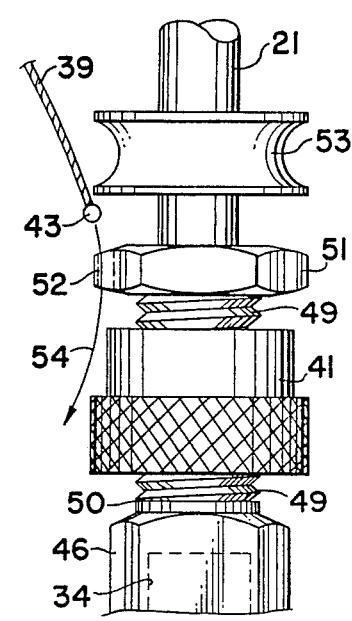
FIG 14
FIG 13

4,839,979

SPEAR GUN TIP ASSEMBLY AND METHOD OF USE THEREOF

RELATED PATENT APPLICATIONS

This is a continuation-in-part application of copending patent application, U.S. Ser. No. 072,297, filed July 13, 1987, by William H. Rogers.

BACKGROUND OF THE INVENTION

Spear gun fishing by underwater divers involves a gun that propels a spear towards a fish. When the spear pierces the fish, the fish usually flips and turns through violent contortions to free itself of the spear. Unless the spear tip is fashioned with devices to prevent it from being retracted from the fish, the spear may be shaken loose by the contortions of the fish and the catch is lost. Spear tips of the prior art included some type of barb which was broader at its base than near the point so that reverse movement of the barb is inhibited. One type of prior art spear tip incorporates two pivotable wings which collapse against the shaft as the spear point passes through the fish, but which pivot outwardly upon any reverse movement of the shaft to allegedly prevent retraction of the spear point through the same hole it entered. This tip is removable from the spear shaft by unscrewing the screw thread connection between the tip and shaft so as to recover the shaft and tip from the fish. A second type of prior art spear tip included a tip with a flared base to prevent its retraction through the entry hole. The spear, however, could be detached from the spear point by merely pulling the two portions apart as by a fish pulling against the tip. The two portions are connected by a length of cord so as not to lose either portion. Neither of these types of spear tips are completely satisfactory because they are not easily recovered from the fish and the tips have to be fed back through the hole in the fish. Also, often the hole in the fish "wallows" out and often the tip feeds itself back into the hole and the fish is lost and/or tip becomes lodged laterally within the fish making it difficult to remove without materially damaging the fish.

It is an object of this invention to provide an improved tip assembly for a spear used in underwater fishing. It is another object of this invention to provide a spear tip assembly which is easily assembled and readily removed from the fish for reassembly. Still other objects are to provide a tip assembly which alleviates the aforementioned problems of the prior art as will become apparent from the more detailed description which follows.

BRIEF SUMMARY OF THE INVENTION

This invention relates to a spear tip assembly for an underwater gun comprising an elongated shaft member having a forward end portion and a rearward end portion; an elongated tip member slidably removable and attachable to the shaft member, and a flexible cable member having a rearward end attached to the shaft member and a forward end portion attached to the tip member. The shaft includes means for detachably attaching the tip member to the forward end portion of the shaft member. Selectively releasable means adjacent the rearward end portion of the shaft is provided for releasably attaching the rearward end of the flexible cable to the rearward end portion of the shaft member. The tip member has a forward end sharpened to a point and rearward end adapted to be slidably detachable to the forward end portion of the shaft member. The forward end of the flexible cable member is attached to the mid-portion of the tip member and the rearward end of the flexible cable member is releasably attachable to the rearward end portion of the shaft member.

In specific embodiments of this invention there is a rearwardly facing barb on the flexible cable to cause the shaft member to be pulled away from the top member by the barb engaging the fish. Also, a clamping means selectively clamps the flexible cable to the rearward end portion of the shaft member and yet be readily releaseable so that the tip member carrying the cable can be pulled from the far side of fish, which withdraws the cable from the fish with minimum damage to the fish.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be understood by reference to the following description taken in connection with the accompanying drawings in which:

FIG. 1 is a front elevational view of one embodiment of the spear tip assembly of this invention;

FIG. 2 is an enlarged top plan view of the sharpened tip of the assembly without the barb and shaft portion of the assembly;

FIG. 3A is a cross sectional view of this invention taken along line 3—3 of FIG. 2;

FIG. 3B is an enlarged partial cross sectional view similar to FIG. 3A more clearly depicting the cable attached to the tip;

FIG. 4 is an enlarged bottom plan view of the rearward end portion of the spear tip assembly of FIG. 1;

FIG. 5 is an enlarged front elevational view of the clamping means of FIG. 1 for detachably securing the flexible cable to the shaft portion;

FIG. 6 is a view similar to FIG. 5 showing the cable secured to the clamping means on the shaft portion;

FIG. 11 is a front elevational view of a second embodiment of the spear tip assembly of this invention;

FIG. 12 is an enlarged bottom plan view of the rearward end portion of the spear tip assembly of FIG. 11;

FIG. 13 is an enlarged front elevational view of the clamping means of FIG. 11 for detachably securing the flexible cable to the shaft portion; and FIG. 14 is a view similar to FIG. 13 showing the cable secured to the clamping means on the shaft portion.

DETAILED DESCRIPTION OF THE INVENTION

Figure 7:
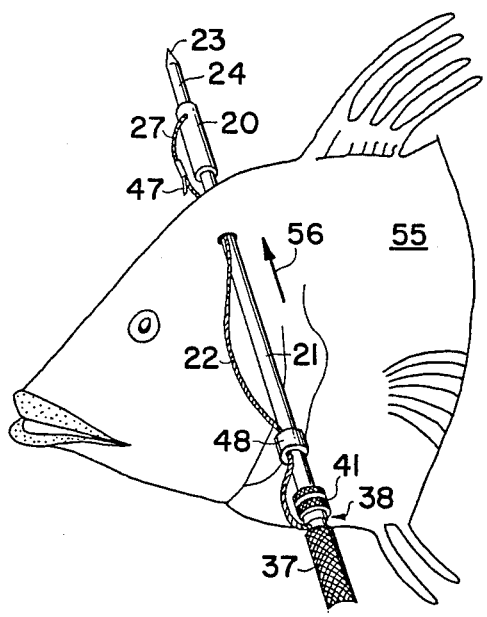
FIG. 7 is a schematic illustration of a fish speared by the assembly of this invention.

The invention is best understood by reference to the attached drawings wherein FIGS. 1-6 show the details of one embodiment of the spear tip assembly of this invention; FIGS. 7-10 illustrate how the assembly is used in spear gun fishing; and FIGS. 11-14 show the details of a second embodiment of the spear tip assembly of this invention.

The spear tip assembly of this invention includes three portions which are assembled and disassembled in use in fishing. The tip portion 20 is slidably connected to the shaft portion 21, and a flexible cable portion 22 is attached to both the tip portion 20 and the shaft 21. Tip portion 20 includes a sharpened point 23 at its forward end 24 and a cup shaped recess 25 at its rearward end 26. Flexible cable 22 is attached at its forward end 27 to tip portion 20 by being inserted through a small passageway 28, and causing a ball 31 to be formed thereon by melting the end 30 of cable 22 in an inert gas atmosphere to form such ball 31 which readily can pass through passageway 29. Ball 31 is thus formed to be too large to pass through passageway 28, thus anchoring cable 22 to tip portion 20 as clearly seen in FIG. 3B. As seen the cable 22 is attached generally midway between forward end 24 and rearward end 26 of tip 20 as seen in FIGS. 1 and 3A.

Shaft portion 21 has a forward end portion 32 which slides into and out of recess 25 in rearward end 26 of tip portion 20. At rearward end portion 33 of shaft portion 21 is a clamping means 38 having recess 34, as seen in FIG. 4, for attachment to a spear 21' (FIG. 9) of a spear gun. Preferably this connection is by screw thread with internal threads 35 in recess 34 and the outer surface 36 receiver 37 being knurled or fashioned with flat sides in order to facilitate the joining of these sections manually by a skin diver. Immediately forward of recess 34 is releaseable clamping means 38 for attaching and releasing the rearward end 39 of flexible cable 22. Clamping means 38 shown here includes an externally threaded adapter 40 rigidly attached to shaft 21, e.g. by welding or soldering, and an internally threaded collar 41 which can be moved upward or downward by the threaded engagement over the outside of receiver 37. Transverse passageway 42 through the upper portion of receiver 37 is adapted to receive rearward end 39 of flexible cable 22. When collar 41 is loosened by turning it in the direction of arrow 44, as seen in FIG. 5, passageway 42 is uncovered to permit cable 22 to be inserted therein or removed therefrom. Cable end 39 is preferably melted much like the forward end of cable 21 so that a ball 43 is formed at the end 39 to facilitate positive clamping. In FIG. 6 collar 41 has been tightened by turning in the direction of arrow 45 until it clamps tightly on cable 22, with ball 44 engaging against shoulder 46 of collar 41 making a positive and tightly clamped arrangement.

Flexible cable 22 is substantially longer than the distance along shaft 21 between the cable attachment points. Adjacent forward end 27 is a rearwardly directed sharp pointed barb 47 immovably attached to cable 22. Barb 47 is adapted to engage against the speared fish so as to permit shaft 21 to become detached from tip portion 20 by action of the fish and/or the skin diver pulling on the spear and/or the line attached to the spear, as more clearly understood from the description hereinafter with regard to FIGS. 7-10.

On shaft 21 there is shown an elastomeric hollow cylindrical collar 48 which is slidable up and down shaft 21. Collar 48 partially functions to keep cable 22 reasonably close to shaft 21 forward of collar 48 to make it easier to pass through the fish with a minimum opening when the fish is speared. Cable 22 passes between collar 48 and shaft 21. Collar 48 also functions to provide sufficient frictional resistance on the cable 22 to maintain the tip portion 20 attached to shaft 21 during diving manuevers with the spear loaded in a spear gun.

In FIGS. 3A and B the preferred attachment of the forward end 27 of cable 22 to tip 20 is depicted. The forward end portion 24 of tip 20 is press fitted into rearward end portion 26. An inclined transverse hole 28 of a diameter slightly larger than cable 22 is drilled through rearward end 26 to admit forward end 27 of cable 21 therethrough. The rearward end portion 26 has a reduced cavity 50 below the forward end portion 24. A larger transverse hole 29 is drilled through end 26 in general alignment with hole 28. Cable 22 is inserted through hole 29 and the end is melted to form ball 31 which is smaller in diameter than hole 29 but larger than hole 28. Cable 22 may be pushed out of hole 29 to facilitate the formation of ball 31. Preferably hole 28 is angled so as to make cable 22 enter rearward portion 26 at an angle of less than 90° and thereby make cable 22 lie more closely adjacent and along rearward portion 26 of tip 20 for the purposes mentioned above.

Figure 8:
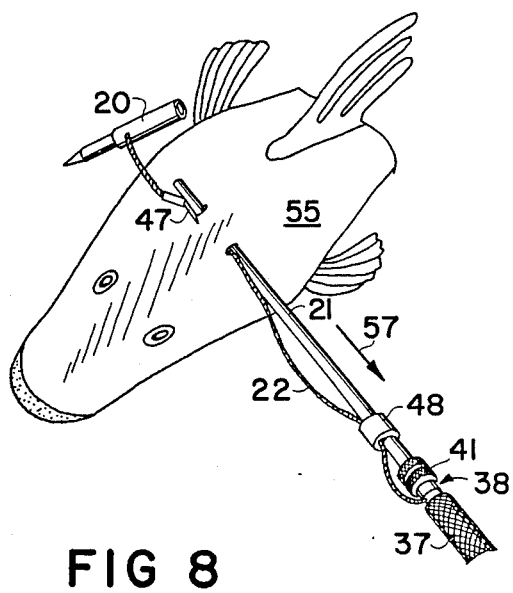
FIG. 8 is a schematic illustration of the spear tip being freed from the shaft and turned to engage the fish.
Figure 9:
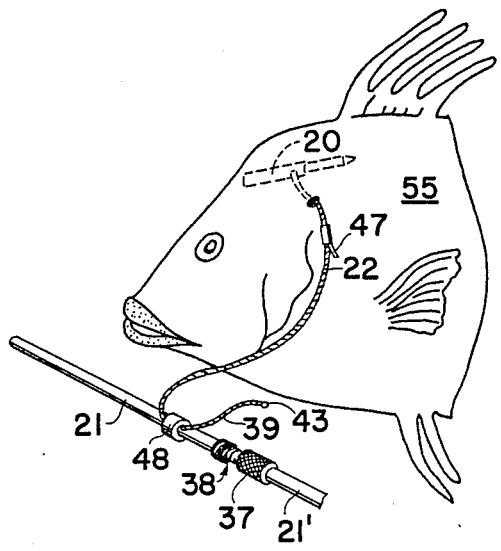
FIG. 9 is a schematic illustration of removing the spear tip from the fish by releasing the rearward end of the cable from the clamping means.
Figure 10:
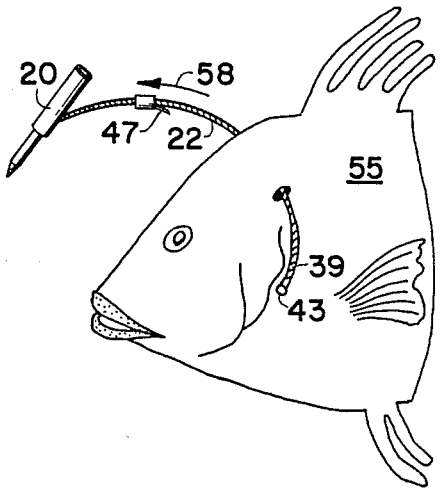
FIG. 10 is a schematic illustration of the final step in removing the spear tip and cable from the fish.

In FIGS. 7-10 there are shown the steps of using the assembly and removing the tip portion 20 once a fish has been speared as shown in FIG. 7, with the tip assembly passing through the fish 55 in the direction of arrow 56. The shaft portion 21 is pulled rearwardly in the direction of arrow 57. Barb 47 catches on the far side of the fish and permits shaft portion 21 to be separated from tip portion 21 and pulled back through the hole in the fish 55. As seen in FIGS. 8 and 9, the tip portion 20 assumes a generally perpendicular position on the far side of the fish 55 to securely hold the fish 55 from dislodging the tip portion 20 or cable 22. In FIG. 9 the rearward end 39 of cable 22 is released from the clamping means 38 by unscrewing collar 41. After cable 22 has been released from shaft 21 and pulled through elastomeric collar 48, cable 22 may be pulled through the fish 55 in the direction of arrow 58, as seen in FIG. 10, freeing tip 20 to be reassembled onto shaft portion 21 for another spear fishing shot.

FIGS. 11-14 show a second embodiment of the spear tip assembly of this invention. The arrangement of the tip portion 20 and its attachment to forward end 32 of shaft 21 and to forward end 27 of cable 22 is exactly the same as described above with respect to FIGS. 1-6. Clamping means 38 is, however, different.

In FIGS. 11-14 clamping means 38 includes a receiver 46 with an internal recess 34 designed to be attached to a spear gun shaft. Preferably the attachment is by internal threads 35 in recess 34 mating with external threads on the end of the spear gun shaft (not shown). The rearward end of shaft 21 includes a threaded portion 49 which is provided by threading the turned down portion 50 of receiver 46. At the upper end of threaded portion 49 is a nut 51 welded rigidly in place and having a small hole 52 drilled through in a direction generally parallel to shaft 21. As seen in FIGS. 13-14, hole 52 is just large enough to permit the rearward ball 43 of cable 22 to pass therethrough. Preferably ball 43 is formed by melting the end of cable 22, as previously described in connection with ball 31 of FIG. 3B. Mounted on threaded portion 49 is internally threaded collar 41 (identical to that of FIGS. 1-10, but oriented in the opposite direction) which can be turned to clamp against nut 51 or backed away from nut 51. On shaft 21 above nut 51 is an elastomeric collar 53 which is slidable up and down shaft 21, but generally is pushed against nut 51 to help hold cable 22 close to shaft 21.

The manner in which this clamping arrangement is used is to back away collar 41 from nut 51, thread the rearward end 39 of cable 22 through hole 52 in the direction of arrow 54, as shown in FIG. 13, and pull cable 22 rearwardly to bring it close to shaft 21. The cable 22 is then held in place as shown in FIG. 14 by advancing collar 41 to clamp against nut 51, which by reason of the positioning of hole 52, provides a stop to prevent ball 43 from passing therethrough. Collar 53 is then pulled rearwardly to press against cable 22 and nut 51 curling up the edge of collar 53 as at 59. This furnishes a frictional engagement which assists in keeping cable 22 taut to inhibit tip 20 from falling off until after the fish is speared, as shown generally in FIGS. 7-10.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A spear tip assembly for an underwater spear gun comprising an elongated shaft member having a long axis, a forward end portion, and a rearward end portion; an elongated tip member slideably and removably attachable to said forward end portion of said shaft member; and an elongated flexible cable member with a forward end attached to said tip member and a rearward end readily affixed and removable with respect to said shaft member, a stop on and adjacent said rearward end of said cable; mounting means on said rearward end portion of said shaft member for attachment to a forward end of a spear; manually releasable clamping means on said rearward end portion of said shaft member for readily detachably securing thereto said rearward end of said flexible cable, said clamping means including a passageway through which said stop and cable may readily move, said clamping means including means to selectively restrict the size of said passageway to prevent disconnecting movement of said stop therefrom; mounting means on said forward end portion of said shaft member for slideably and removably attaching said tip member thereto, said tip member having a forward sharpened free end and a rearward end including mating means adapted to be slideably detachable to said forward end of said shaft member.

2. The assembly of claim 1 further comprising a rearwardly pointing barb affixed to said flexible cable adjacent said forward end of said cable, which is adapated to engage the far side of a speared fish to effect relative movement between a fish and said shaft member to release said tip member from said shaft member.

3. The assembly of claim 1 wherein said passageway is substantially parallel to said long axis on a rigid member affixed to and of a size to permit passage of said flexible cable therethrough, said cable having an adjustable collar on said shaft member adjacent said passageway to selectively restrict disconnecting movement of said stop therethrough without impeding sliding movement of said cable in said passageway.

4. The assembly of claim 3 wherein said rigid member is affixed to an externally threaded portion of said shaft, said adjustable collar having internal threads which mate with external threads of said threaded portion for adjustably positioning said collar toward and away from said rigid member and said passageway.

5. The assembly of claim 3 further comprising an elastomeric collar positioned around said shaft member and slideably longitudinally thereon forward of said clamping means, said flexible cable member passing slideably through said passageway and in contact with said rigid member, said elastomeric collar being adapted to frictionally engage said cable where it emerges from a forward end of said passageway.

6. The assembly of claim 1 wherein said passageway extends generally laterally through said shaft.

7. The assembly of claim 1 wherein said passageway extends substantially parallel to said shaft.

8. The assembly of claim 7 wherein said releasable clamping means includes a laterally extending flange rigidly affixed to said shaft, said passageway extending through said flange, said passageway being larger than said stop, said releasable clamping means including an adjustable collar adjacent said passageway to selectively restrict said passageway to inhibit passage of said stop therethrough while otherwise permitting free movement of said cable therethrough.

9. A spear tip assembly for attachment to the forward end of a spear of an underwater spear gun, said spear tip assembly comprising an elongated tip member, an elongated shaft member having a forward end portion and a rearward end portion, and an elongated flexible cable member with a forward end portion attached to said tip member and a rearward end portion attached to said shaft member, said tip member having a forward sharpened end and a rearward blunt end including a cup shaped recess for snugly receiving said forward end portion of said shaft member therein, said forward end of said flexible cable member being connected to said tip member generally medially between said sharpened and blunt ends, said rearward end portion of said shaft member including a recess for attachment to a spear, a passageway affixed with respect to said shaft, said cable member rearward end portion being slidable through said passageway, said cable member rearward end portion having a stop thereon smaller than said passageway, and adjustable means to selectively restrict said stop from passing through said passageway without inhibiting sliding movement of said cable member through said passageway.

10. The assembly of claim 9 further comprising an elastomeric collar slideably mounted on said shaft member forward of said passageway, said elastomeric collar being positionable to frictionally engage said flexible cable member by pressing outwardly against said cable member adjacent said passageway.

11. The assembly of claim 9 wherein said flexible cable member is longer than the distance between its attachments to said shaft member and said tip member, and barb means attached to said cable adjacent said forward end and having a sharp pointed prong facing rearwardly to engage a far side of a fish speared by said tip member and said forward end portions of said cable and shaft members to cause release of said tip member from said shaft member.

12. The assembly of claim 9 wherein said passageway is defined by a clamping member attached to said shaft member and extending laterally of said shaft, said adjustable means includes an externally threaded portion on said shaft mating with an internally threaded collar adapted to be adjusted forcibly against said clamping member adjacent a rearward end of said passageway to partially restrict same below the size of said stop.

13. The assembly of claim 12 wherein said shaft member is located substantially centrally of said clamping member and rigidly affixed thereto, said passageway being located adjacent the outer perimeter of said clamping member.

14. The assembly of claim 9 wherein said forward end of said flexible cable member is formed with a ball at its end, said tip member having a hollow medial portion, another passageway passing generally transversely through said medial portion and communicating with its hollow, said another passageway adjacent one of its end portions through which said cable extends having a cross-sectional dimension slightly greater than said cable member but less than said ball whereby said cable member is joined thereto to prevent loss of said tip member in repeated use of said assembly.

15. The assembly of claim 14 wherein said one end portion of said another passageway has an axis forming an acute angle with a longitudinal axis of said tip member whereby said ball is generally forwardly of said one end portion of said passageway adjacent an outer wall of said tip member whereby said cable member is positioned closely and generally parallel to said tip member outer wall.

16. The assembly of claim 15 further comprising an elastomeric collar slideably mounted to said shaft member forward of said clamping member and extending laterally sufficiently to cover said passageway through said clamping means when said elastomeric collar is contiguous thereto.

17. The assembly of claim 9 wherein said stop is defined by a ball formed integrally onto the end of said cable member, said ball being released to pass through said passageway upon sufficient movement of said adjustable means to a location to unrestrict said passageway.

18. A method of spearing fish with a spear tip assembly having an elongated tip, an elongated shaft and an elongated cable between the tip and shaft and a barb on the cable adjacent the tip comprising the steps of:
   A. firing the spear into a fish to dispose the tip and part of the cable and barb and forward end of the shaft on the far side of the fish;
   B. engaging the far side of the fish with the barb to cause the tip to release from the shaft by relative withdrawing movement of the shaft from the fish and positioning the tip generally alongside of the fish transversely of the hole made through the fish by the tip and attached cable;
   C. releasing the rearward end of the cable from the shaft; and
   D. grasping the tip with the attached cable and pulling the cable through the hole in the fish to release the fish therefrom.

19. The method of claim 18 further comprising the steps of:
   E. reconnecting the rearward end of the cable to the shaft after step D; and
   F. repeating steps A-D.

20. The method of claim 18 further comprising the steps of:
   E. reattaching the tip to the forward end of the shaft after step D; and
   F. reconnecting the rearward end of the cable to the shaft.

* * * * *